United States Patent Office 3,510,322
Patented May 5, 1970

3,510,322
WATER SETTABLE QUICK SETTING CEMENT COMPOSITION AND A METHOD OF MAKING SAME
Setsuo Higashi, 19–8 Kasumigaokadanchi, Fukuoka-machi, Iruma-gun, Saitama Prefecture, Japan, and Kuneo Taguchi, 1151 Ou-machi, Kamakura, Kanagawa Prefecture, Japan
No Drawing. Continuation-in-part of application Ser. No. 387,978, Aug. 6, 1964. This application Dec. 14, 1967, Ser. No. 690,378
Int. Cl. C09k 3/00
U.S. Cl. 106—35     5 Claims

ABSTRACT OF THE DISCLOSURE

Quick setting cement, settable by the addition of water alone, produced by combining a mono-metallic metal phosphate which has been molecularly dehydrated to the acid pyrophosphate form with a compatible metal oxide or silicate to produce a material having a high compressive strength upon setting.

Cross references to related applications

This application is a continuation-in-part of our co-pending application Ser. No. 387,978, filed Aug. 6, 1964 and now abandoned.

Background of the invention

The present invention relates to the production of quick setting cements particularly useful as dental cements.

At the present time, two kinds of cements are widely used in dentistry, one being known as the "zinc phosphate cement" which is used as an adhesive cement, and the other being the so-called "silicate cement" which is used as a filling cement. Both of these cements are set by mixing the ingredients with liquid phosphoric acid in high concentration, and are not settable by water alone.

Description of the prior art

The conventional zinc phosphate cement is composed of a powder produced by pulverizing a zinc oxide clinker containing other metal oxides in addition to zinc oxide, and baked at a temperature of about 1300° C. This material is then dissolved in liquid phosphoric acid having a concentration of about 60% and usually containing some compound of aluminum.

The silicate cement is produced by heating a mixture of alumina and silica to a temperature of about 1400° C., and powdering the silicate clinker resulting. These powders are then set by mixing with liquid phosphoric acid in the same manner as the previously mentioned zinc phosphate cement.

Some attempts have been made to produce a water settable phosphate-type cement, but with very limited success. For example, in Alien Property Custodian specification 283,225 there is described a cement which is said to be settable upon mixing with water to form a hard and resistant filling. However, cements of this type do not meet the standard specifications for resistance to disintegration by water in most instances and their usefulness is therefore limited.

Summary of the invention

The present invention deals with an improved quick setting cement composition containing an acid pyrophosphate of one or more of the metals calcium, manganese, zinc, titanium, cadmium, tin or barium in combination with an oxide or silicate of the same group of metals. The acid pyrophosphate may be conveniently prepared by dehydrating conventional metallic salts of phosphoric acid at temperatures ranging broadly from 150 to 300° C. to achieve molecular dehydration.

The pyrophosphate and the oxide or silicate are combined in ratios of from 0.25 to 2.5 parts phosphate to 1 part oxide or silicate, and preferably 40 to 70 percent of the oxide and the balance phosphate. In the case of silicate, we prefer 50 to 80 percent of the silicate, with the balance being the acid pyrophosphate. The particularly preferred compositions contain 60 percent oxide or 70 percent silicate. The entire phosphate content need not be the pyrophosphate, but for purposes of improved strength, at least 25 percent of the total phosphate content should be in the form of a pyrophosphate.

The particle size of the phosphate employed is about 200 mesh or less, while the particle size for the oxide and silicate should be about 400 mesh or finer.

Description of the preferred embodiments

We have been studying the mechanism of setting of phosphate cements for several years, and we have reached the conclusion that these cements do not, as commonly thought, set by virtue of the production of crystals of the secondary or tertiary salt of phosphoric acid, but actually by the gelation of aqueous sols of the tertiary salt of phosphoric acid or the orthophosphate from a supersaturated solution. These sols are dispersed into the water existing in the reaction system as well as by the water produced by the reaction. Gradually, the set material changes to crystals of the orthophosphate.

The improved cement of the present invention not only eliminates the necessity of adding phosphoric acid to the composition but is also improved over the older type zinc phosphate cements in the matter of providing a stronger set material more quickly, exhibiting no diminution of strength in air or in water, being non-irritating to sensitive membranes, and exhibiting little dimensional change in heat evolution upon setting. The cement evidences very little disintegration or dissolution in water or saliva, and is considerably easier to handle in transport and storage than the conventional zinc phosphate cement.

In this connection, the cements of the present invention have been found to possess strength values considerably in excess of the minimum specified by the American Dental Association or the Federation Dentaire Internationale. The specifications of both organizations require that the dental cement have a compressive strength of at least 840 kilograms per square centimeter after seven days. The cement should have a setting time of 4 to 10 minutes at 37° C. The film thickness should be no more than 40 microns, and it should have solubility not exceeding 0.30% by weight after immersion in distilled water for seven days at 37° C. Generally, the materials produced according to the present invention have compressive strengths of about twice the required minimum.

The particularly preferred acid pyrophosphate for use in accordance with the present invention is calcium pyrophosphate. This material, however, is not very resistant to moisture, and we therefore prefer to add undehydrated primary phosphates of manganese and zinc to calcium acid pyrophosphate to improve moisture resistance. In such dental cements, the calcium acid pyrophosphate essentially controls the speed of setting. The zinc primary phosphate is also helpful in improving the transparency of the composition and its strength. The manganese primary phosphate adds significant moisture resistance to the composition. Particularly improved results are obtained by mixing equal parts by weight of the calcium pyrophosphate, manganese primary phosphate, and zinc primary phosphate, and combining forty parts of the resulting mixture with sixty parts of an oxide such as zinc oxide. The resulting mixture is then settable into a strong cement by combining 100 grams of the mixture with from 10 to 20 ccs. of water, preferably about 13 ccs. of water.

The starting materials for the purpose of the present invention are the conventional mono-metallic acid phosphates which upon molecular dehydration, yield the acid pyrophosphate. The preferred temperature ranges for dehydration for each of the phosphates of the present invention are given in the following table:

TABLE I

| Salt of phosphoric acid | Molecular formula | Temperature range of dehydration (° C.) |
| --- | --- | --- |
| Mono-calcium phosphate | $Ca(H_2PO_4)_2$ | 200–300 |
| Mono-titanium phosphate | $Ti(H_2PO_4)_2$ | 200–300 |
| Mono-manganese phosphate | $Mn(H_2PO_4)_2$ | 200–300 |
| Mono-zinc phosphate | $Zn(H_2PO_4)_2$ | 200–300 |
| Mono-cadmium phosphate | $Cd(H_2PO_4)_2$ | 250–350 |
| Mono-stannous phosphate | $Sn(H_2PO_4)_2$ | 250–350 |
| Mono-barium phosphate | $Ba(H_2PO_4)_2$ | 250–350 |

As mentioned, some of the compositions are likely to have hygroscopic properties. In such instances, it may be desirable to coat the salt to protect it against water absorption. One of the most effective methods is to coat the surface of the salt by adding finely divided zinc hydroxide and phosphoric acid in the ratio of one molecular proportion of the former to 0.5 to 2.5 molecular proportions of the latter. In some cases it is desirable to retard the setting rate of these normally fast setting cements. When this is desirable, we suggest the addition of material such as borax, boric acid, secondary sodium phosphate, sodium chloride or gypsum plaster. Borax, for example, retards the setting rate by about ten minutes, and the others by at least several minutes.

While the present invention is directed primarily at the production of dental cements, the improvements thereof are also useful in industrial cements. In this type of application, part or all of the oxide content of the composition can be replaced by the corresponding hydroxide.

The following specific examples illustrate various embodiments of the invention.

EXAMPLE I

Mono-calcium phosphate was dehydrated at a temperature of 240° C. for 30 minutes. Particles of the resulting acid pyrophosphate salt, having a particle size on the order of 200 mesh, were coated with a coating composition consisting of 10% of zinc hydroxide and 9% of phosphoric acid, based upon the weight of the phosphate particles. The coated phosphate material was combined with a zinc oxide clinker which had been heated to a temperature of 1250° C. and which had a particle size of 400 mesh. The ratio of phosphate to clinker was 41 to 59 parts by weight, and the cement was hydrated by the addition of 20 cc. of water per 100 grams of the mixed powders. The cement had a setting time of 4 minutes and a white color. It had a compressive strength of 900 kilograms per square centimeter after 1 hour and a compressive strength of 1200 kilograms per square centimeter after 24 hours.

EXAMPLE II

Mono-titanium acid phosphate was dehydrated at a temperature of 200 to 300° C. to produce the acid pyrophosphate, and 200 mesh particles of this material were combined with a zinc oxide clinker which had been treated at a temperature of 1250° C. the zinc oxide having a particle size of about 400 mesh. The two were combined at the ratio of 41 parts of phosphate to 59 parts of the zinc oxide and 15 grams of water were used to hydrate 100 grams of the mixed powder. The cement had a setting time of 5 minutes, and a white color. It evidenced a compressive strength of 800 kilograms per square centimeter after 1 hour and 1000 kilograms per square centimeter after 24 hours.

EXAMPLE III

Mono-zinc acid phosphate was dehydrated to the acid pyrophosphate form by heating at a temperature of 200 to 300° C. for 30 minutes. Particles of the resulting phosphate of 200 mesh size were combined with barium oxide which had been treated at a temperature of 1350° C. The proportions were 47 parts of the phosphate to 53 parts of the barium oxide. The resulting cement had a setting time of 3 minutes, and a white color, and evidenced a compressive strength of 1100 kilograms per square centimeter after 1 hour and 1500 kilograms per square centimeter after 24 hours.

EXAMPLE IV

An acid pyrophosphate of cadmium was produced by heating mono-cadmium acid phosphate at a temperature of 250 to 350° C. for 30 minutes. The resulting phosphate in 200 mesh particle size was combined with a mixture of equal molecular proportions of zinc oxide and ferric oxide which had been pretreated at a temperature of 1200° C. The phosphate and the oxide particles were combined in equal parts. The cement was made up using 15 cc. of water for 100 grams of the combined powders. The cement had a setting time of 5 minutes, had a white color, and had a compressive strength of 800 kilograms per square centimeter after 1 hour and 1000 kilograms per square centimeter after 24 hours.

EXAMPLE V

A mono-stannous phosphate was molecularly dehydrated at a temperature of 250 to 350° C. Particles having a size of 200 mesh were combined with the same zinc oxide-ferric oxide mixture mentioned in the preceding example, in the same ratios. The cement set in 5 minutes and had a white color. After 1 hour it had a compressive strength of 900 kilograms per square centimeter and a compressive strength of 1100 kilograms per square centimeter after 24 hours.

EXAMPLE VI

Mono-barium acid phosphate was dehydrated by treatment at a temperature of 250 to 350° C. for 30 minutes to produce the acid pyrophosphate. Particles of the pyrophosphate were combined with a mixture of 2 molecular parts of zinc oxide and 1 molecular part of magnesia, the mixture having been treated at a temperature of 1200° C. The zinc oxide-magnesia mixture had a particle size of 400 mesh. Equal parts by weight of the phosphate and the oxide powders were used. The water to powder ratio was 20 cc. per 100 grams. The cement set in 4 minutes and had a white color. After 1 hour, the compressive strength was 900 kilograms per square centimeter and after 24 hours it was 1200 kilograms per square centimeter.

EXAMPLE VII

Mono-calcium phosphate was dehydrated at 240° C. for 30 minutes. The particles were coated with a coating of zinc hydroxide and phosphoric acid as in Example I. The coated particles were combined with a 300 mesh zinc silicate containing 2 molecular proportions of zinc oxide for every molecular proportion of silica. This silicate had been pretreated at a temperature of 1350° C. and 30 parts of the phosphate were combined with 70 parts of the silicate. The water to powder ratio was 20 to 100. The cement set in 8 minutes to a white color. It had a compressive strength of 1200 kilograms per square centimeter after 1 hour and 1600 kilograms per square centimeter after 24 hours.

EXAMPLE VIII

Mono-titanium phosphate was dehydrated to the acid pyrophosphate form, and 200 mesh particles of the resulting phosphate were combined with a calcium silicate having 2 molecular proportions of calcium oxide for every molecular proportion of silica. The silicate had been pretreated at 1350° C. and was combined with the phosphate in the ratio of 30 parts phosphate to 70 parts silicate. The water to powder ratio was 16 to 100. The cement set in 7 minutes to a white color. The compressive strength after 1 hour was 1100 kilograms per square centimeter, and 1400 kilograms per square centimeter after 24 hours.

EXAMPLE IX

A mono-manganese phosphate was molecularly dehydrated to the acid pyrophosphate, and 200 mesh particles of this phosphate were combined with a zinc silicate containing 2 molecular proportions of zinc oxide for every molecular proportion of silica. The zinc silicate had been pretreated at 1350° C. and had a particle size of 300 mesh. 35 parts by weight of phosphate were employed for 65 parts by weight of the silicate. The water to powder ratio was 16 to 100. This produced a cement having a setting time of 6 minutes, and a very light pink color. It had a compressive strength of 1800 kilograms per square centimeter after 1 hour, and 2500 kilograms per square centimeter after 24 hours.

EXAMPLE X

An acid pyrophosphate was produced by molecularly dehydrating mono-zinc phosphate and the resulting phosphate was combined with a zinc silicate containing 3 molecular proportions of zinc oxide to 2 molecular proportions of silica. This material had been preheated at temperatures of 1350° C. and was used in a particle size of 400 mesh. The ratio of phosphate to silicate was 30 to 70 and the water to powder ratio was 16 to 100. This material was set in 7 minutes and had a white color of considerable transparency. It had a compressive strength of 1800 kilograms per square centimeter after 1 hour and 2500 kilograms per square centimeter after 24 hours. This material represented an excellent combination of strength and transparency characteristics.

EXAMPLE XI

Mono-cadmium phosphate was dehydrated at a temperature between 250 and 350° C. The resulting phosphate was combined with a calcium silicate having 3 molecular proportions of calcium oxide for 2 molecular proportions of silica. The silicate had been heated at a temperature of 1350° C. The weight ratio of phosphate to silicate was 35 to 65, and the water to powder ratio was 16 to 100. The cement set in 10 minutes and had a white color. It had a compressive strength of 1100 kilograms per square centimeter after 1 hour and 1500 kilograms per square centimeter after 24 hours.

EXAMPLE XII

Mono-stannous phosphate after dehydration to the acid pyrophosphate form was combined with zinc silicate having 2 molecular proportions of zinc oxide for every molecular proportion of silica. The silicate had been pretreated at a temperature of 1350° C. The phosphate to silicate ratio was 35 to 65 by weight. The water to powder ratio was 16 to 100. This produced a cement setting in 8 minutes and having a white color. The compressive strength was 1500 kilograms per square centimeter after 1 hour and 2000 kilograms per square centimeter after 24 hours.

EXAMPLE XIII

Mono-calcium phosphate was dehydrated at a temperature of 240° C. for 30 minutes. The particles were coated with a coating of zinc hydroxide and phosphoric acid as in Example I. The resulting pyrophosphate was combined in the weight ratio of 1:1:1 with undehydrated manganese primary phosphate, and undehydrated zinc primary phosphate. Forty parts of the phosphates were combined with 60 parts of zinc oxide (400 mesh). This produced a cement having a film thickness of 20 microns, and a compressive strength after 1 hour of 1000 kilograms per square centimeter, which increased to 1700 kilograms per square centimeter after 24 hours. It evidenced a disintegration of less than 0.1% in distilled water for 7 days at 37° C. The setting rate for 100 grams of powder/13 cc. water was 5 minutes.

It should be evident that various modifications can be made to the described embodiments without departing from the scope of the present invention.

We claim as our invention:

1. A quick setting cement consisting essentially of an acid pyrophosphate of a metal selected from the group consisting of calcium, manganese, zinc, titanium, cadmium, tin and barium, said pyrophosphate being the product obtained by melocular dehydration of the corresponding mono-metallic acid phosphate at a temperature of from 200 to 350° C. in combination with a metal compound selected from the group consisting of the oxides and silicates of a metal selected from the aforementioned group, said pyrophosphate being present in an amount of from 0.25 to 2.5 parts by weight to 1 part by weight of said metal compound.

2. The cement of claim 1 in which said metal compound is an oxide of said group in amounts of from 40 to 70% by weight and the balance is said acid pyrophosphate.

3. The cement of claim 1 in which said metal compound is a silicate of said selected metal in amounts of from 50 to 80% by weight, and the balance is said acid pyrophosphate.

4. The cement of claim 1 in which said acid pyrophosphate is the acid pyrophosphate of calcium and said oxide is zinc oxide.

5. A quick setting dental cement comprising particles of a mono-calcium acid pyrophosphate resulting from the dehydration of mono-calcium phosphate at a temperature of from 200–300° C., said particles being coated with a mixture of zinc hydroxide and phosphoric acid in the ratio of one molecular proportion of zinc hydroxide to 0.2 to 2.5 molecular portions of phosphoric acid, in combination with a zinc oxide powder having a particle size of about 400 mesh, the amount of pyrophosphate being from .25 to 2.5 times by weight the amount of oxide, the resulting powder mixture being settable with water in the ratio of 100 grams of powder to 20 cc. of water to produce a set product having a compressive strength of about 900 kilograms per square centimeter after one hour of set.

References Cited

UNITED STATES PATENTS

| 3,189,470 | 6/1965 | Long | 106—39 |
| 2,479,504 | 1/1949 | Moore et al. | 22—188 |
| 1,548,616 | 4/1925 | Kruger | 106—35 |

OTHER REFERENCES

Alien Property Custodian SN 283,225, Schmidl, Nov. 5, 1968, 106/35.

DONALD J. ARNOLD, Primary Examiner

T. MORRIS, Assistant Examiner

U.S. Cl. X.R.

23—108, 109; 106—286